US012771648B2

(12) United States Patent
Severino

(10) Patent No.: US 12,771,648 B2
(45) Date of Patent: Oct. 20, 2026

(54) DATA COMMUNICATION APPARATUS AND METHOD

(71) Applicant: Arm Limited, Cambridge (GB)

(72) Inventor: Christopher Vincent Severino, Cambridge (GB)

(73) Assignee: Arm Limited, Cambridge (GB)

( * ) Notice: Subject to any disclaimer, the term of this patent is extended or adjusted under 35 U.S.C. 154(b) by 678 days.

(21) Appl. No.: 17/811,757

(22) Filed: Jul. 11, 2022

(65) Prior Publication Data

US 2023/0019132 A1 Jan. 19, 2023

(30) Foreign Application Priority Data

Jul. 16, 2021 (GB) .................................... 2110239

(51) Int. Cl.
*H04L 47/34* (2022.01)
*H04L 47/43* (2022.01)

(52) U.S. Cl.
CPC .............. *H04L 47/34* (2013.01); *H04L 47/43* (2022.05)

(58) Field of Classification Search
CPC .......... H04L 47/34; H04L 47/43; H04L 47/36
See application file for complete search history.

(56) References Cited

U.S. PATENT DOCUMENTS

| | | | | |
|---|---|---|---|---|
| 2014/0310566 | A1* | 10/2014 | Balakrishnan | H04L 7/0029 714/748 |
| 2017/0111249 | A1* | 4/2017 | Hardt | H04W 24/08 |
| 2018/0041441 | A1* | 2/2018 | Tokumo | H04L 69/324 |
| 2018/0309859 | A1 | 10/2018 | Hiramoto et al. | |
| 2019/0073011 | A1 | 3/2019 | Paterson et al. | |
| 2019/0245802 | A1 | 8/2019 | Carey | |
| 2019/0245951 | A1 | 8/2019 | Kim et al. | |
| 2019/0394144 | A1 | 12/2019 | Doree et al. | |
| 2021/0092058 | A1* | 3/2021 | Popilov | H04L 45/566 |

* cited by examiner

*Primary Examiner* — Asad M Nawaz
*Assistant Examiner* — Najeeb Ansari
(74) *Attorney, Agent, or Firm* — NIXON & VANDERHYE P.C.

(57) ABSTRACT

A data communication apparatus having a message receiver, and a message transmitter to transmit messages to the message receiver. The message transmitter being configured to partition a payload greater than a predetermined size into a set of plural successive messages each being no larger than the predetermined size and to associate one or more flags with respective ones of the set of plural successive messages, the one or more flags indicating an ordering of messages within a set of plural successive messages, and the message receiver having a buffer to buffer received messages of a set of plural successive messages to reassemble a payload represented by the given set of plural successive messages, and a detector to detect an expected ordering of the one or more flags with respect to receipt by the message receiver of messages of a given set of plural successive messages.

11 Claims, 5 Drawing Sheets

DATA COMMUNICATION APPARATUS AND METHOD

CROSS-REFERENCE TO RELATED APPLICATIONS

This application claims priority pursuant to 35 U.S.C. 119(a) to United Kingdom Patent Application No. 2110239.7, filed Jul. 16, 2022, which application is incorporated herein by reference in its entirety.

BACKGROUND

This disclosure relates to data communication apparatus and methods.

It is known to provide communication Interface circuitry sometimes known as a message handling unit (MHU) to provide or facilitate data communication across different so-called "domains" such as power, clock and/or reset domains. Typically an MHU provides circuitry configured to interface with each respective domain and to provide a bridge between the different domains.

It is in the context of this type arrangement that the present disclosure arises.

SUMMARY

In an example arrangement there is provided data communication apparatus comprising:

a message receiver; and a message transmitter to transmit messages to the message receiver;

the message transmitter being configured to partition a payload greater than a predetermined size into a set of plural successive messages each being no larger than the predetermined size and to associate one or more flags with respective ones of the set of plural successive messages, the one or more flags indicating an ordering of messages within a set of plural successive messages; and the message receiver comprising:

a buffer to buffer received messages of a set of plural successive messages to reassemble a payload represented by the given set of plural successive messages; and a detector to detect an expected ordering of the one or more flags with respect to receipt by the message receiver of messages of a given set of plural successive messages.

In another example arrangement there is provided a data communication method comprising:

transmitting messages from a message transmitter to a message receiver;

the transmitting step comprising:

partitioning a payload greater than a predetermined size into a set of plural successive messages each being no larger than the predetermined size; and associating one or more flags with respective ones of the set of plural successive messages, the one or more flags indicating an ordering of messages within a set of plural successive messages; and receiving the messages at a message receiver, the receiving step comprising:

buffering received messages of a set of plural successive messages to reassemble a payload represented by the given set of plural successive messages; and detecting an expected ordering of the one or more flags with respect to receipt by the message receiver of messages of a given set of plural successive messages.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1A:
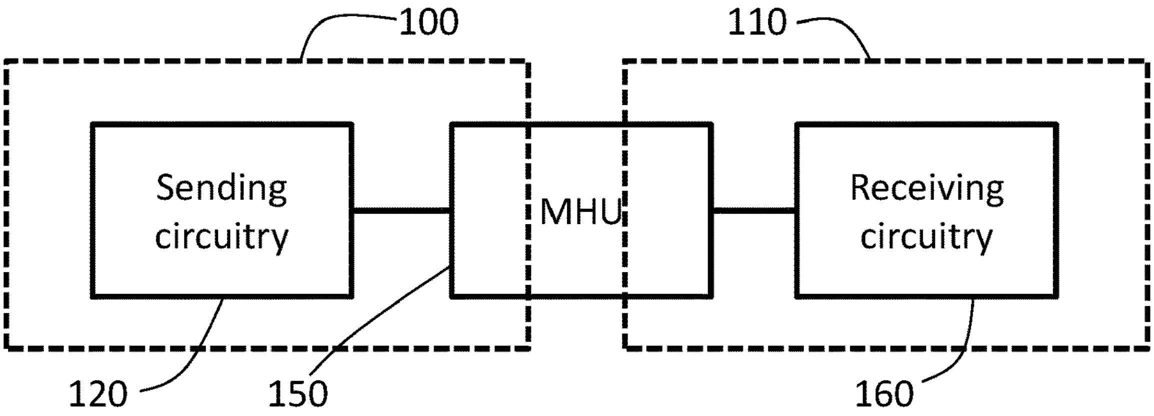
FIG. 1*a* schematically illustrates an example data processing apparatus.

Referring now to the drawings, FIG. 1*a* schematically illustrates an example data processing apparatus in which example message sending circuitry 120 in a first domain (for example, a power, clock and/or reset domain) communicates with receiving circuitry 160 in a second such domain 110 via a so-called message handling unit (MHU) 150.

Figure 1B:
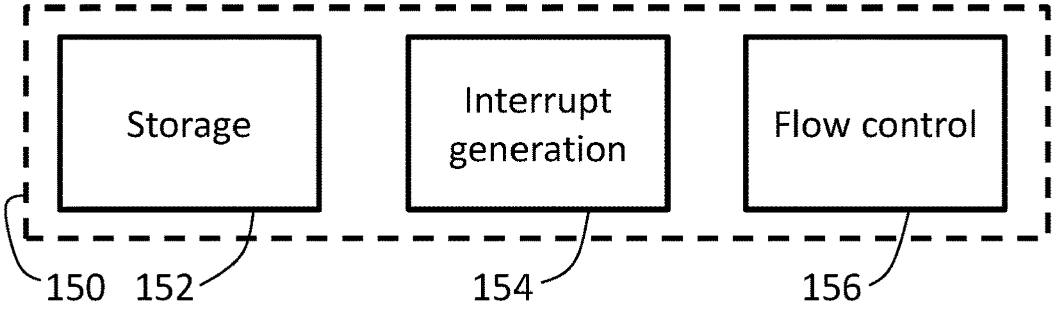
FIG. 1*b* schematically illustrates an overview of a message handling unit (MHU)

As shown schematically in FIG. 1*b*, the MHU comprises storage circuitry 152 (for example, registers such as flip-flops, or RAM), interrupt generation circuitry 154 and flow control circuitry 156. Techniques by which the MHU operates will be discussed further below.

In operation, the sending circuitry 120 sends a message to the MHU 150 which may temporarily store the message in the memory 152 before sending the message on to the receiving circuitry 160.

Importantly, it is noted that the sending circuitry 120 and the receiving circuitry 160 have these functionalities for the purposes of the transmission of a particular example message (from left to right as the apparatus is drawn). In practice, a data communication node such as a processing element and associated circuitry may be connected in the first domain 100 and another data communication node in the second domain 110, with each of these nodes selectively acting as a sending circuitry or a receiving circuitry depending on the direction of transfer of any given message.

The messages may have a predetermined maximum length or size of N bits, such as 32 bits. Examples of the data to be transferred can be header information (message type, recipient, sender) and payload (data to be processed, additional commands). The nature of the message content is immaterial to the operation and function of the MHU. Techniques for handling potentially longer messages will be discussed below. In brief, the MHU has the ability to send a message of N bits, which implies that messages which are longer than N bits must be split into plural successive message portions (X message portions) (each of no more than N bits) and reconstructed at the receiver. A (longer than N bit) message is therefore made up of multiple message portions where a message portion is a single quantum of data of no more than N bits sent from the sending circuitry to the receiving circuitry.

In examples of the present techniques, if multiple message portions are required to be sent to form a single message then flags (to be discussed below) are used to indicate the start and end of the plural successive messages portions which form the message.

Figure 2:
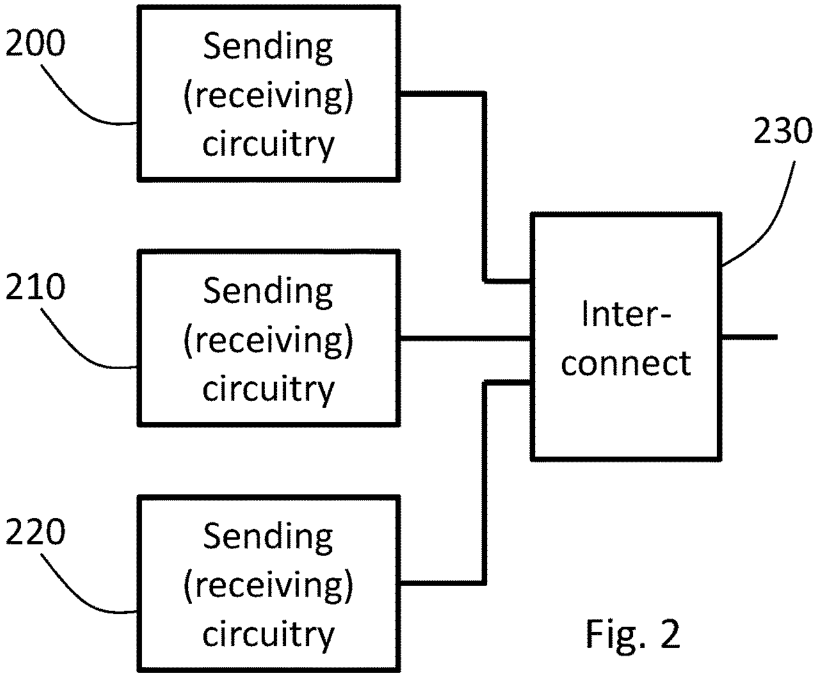
FIG. 2 schematically illustrates a plurality of circuitries connected via interconnect circuitry.

A further introductory concept is that within a given domain, there may be multiple instances of data communication nodes (sending/receiving circuitry) 200, 210, 220 . . . connected together by interconnect circuitry 230 to provide an interface with the message handling circuitry 150, as shown schematically in FIG. 2.

Figure 3A:
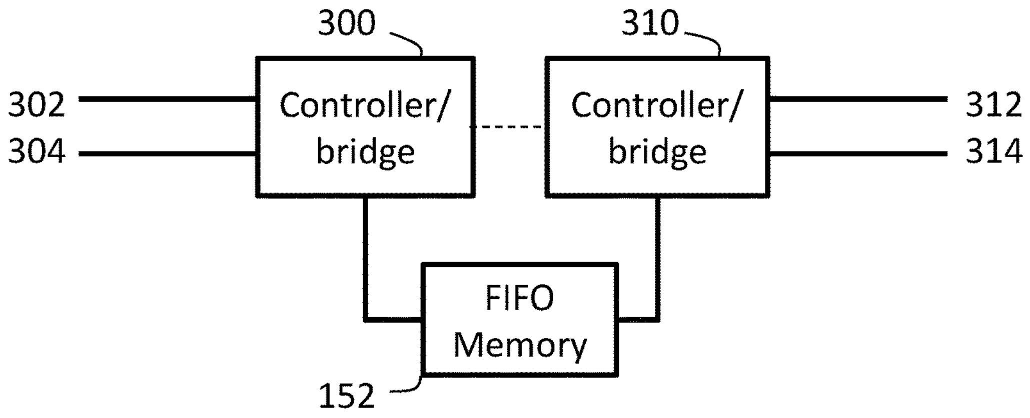
FIG. 3*a* schematically illustrates aspects of a MHU.
Figure 3B:
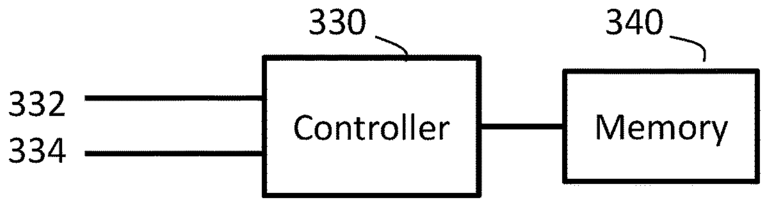
FIG. 3*b* schematically illustrates aspects of a message receiver.

FIG. 3*a* schematically illustrates aspects of the MHU 150 in that it provides a controller/bridge circuitry 300 operable in the domain 100 and controller/bridge circuitry 310 operable in the domain 110, as examples illustrating aspects of the operation of the interrupt generation circuitry 154 and the flow control circuitry 156. Both of the controller/bridge circuitries 300, 310 can access the memory 152 which, in this example, is shown as a first-in-first-out (FIFO) memory 320. It is not a requirement that a FIFO memory is used; it is convenient to use one as it retains the ordering of the messages or message portions (transfers) as they are processed, but other types of memory could be used (for example in which a counter is associated with each received message portion or transfer to allow the partitioned payload to be reconstructed).

The controller/bridge circuitry 300, when receiving a message from the sending circuitry 120 by data and control signals 304, stores the message (as received from a sending circuitry) in the memory 152. The controller/bridge circuitry 310 then retrieves the stored message from the memory 152 and raises an interrupt 312 to the receiving circuitry to initiate transmission of the message by data and control signals 314 to the receiving circuitry 160.

At the receiving circuitry 160, a controller 330 may receive an interrupt 332 (the interrupt which was raised as the interrupt 312 by the MHU) and in response to receipt of the interrupt 332 it also receives data/control signals 334 (representing the data and control signals 314 provided by the MHU) relating to a received message and stores the received message or at least message portions of it in a receiving circuitry memory 340.

An interrupt 302 to the sending circuitry is generated by the controller/bridge circuitry 300 when the receiving circuitry acknowledges the data by either reading the data or writing to an acknowledge register.

Therefore, the memory 152 and the memory 340 provide respective examples of a buffer to buffer received messages of a set of plural successive messages to reassemble a payload represented by a set of plural successive messages.

As mentioned above, a predetermined maximum size such as N bits may be imposed upon the transmission of any individual message. An example of such a predetermined maximum size is 32 bits, but a different predetermined maximum size may apply in a given system. This then leads to a question of how to handle message transfers where a required payload is longer than that which can be carried by a message of that predetermined maximum size.

Figure 4:
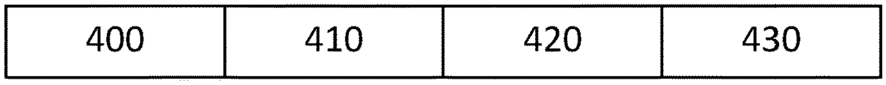
FIG. 4 schematically illustrates a group of message portions.

In the present examples, a longer payload is partitioned into multiple individual messages each complying with the predetermined maximum size. In an example shown in FIG. 4, a message payload of (say) between 96 and 128 bits is partitioned into four portions 400, 410, 420, 430. In at least some examples, portions are created of the predetermined maximum size except for potentially a last portion which, depending upon the payload size, may be up to the predetermined maximum size with dummy or padding data inserted to form the final message of the predetermined maximum size.

These message portions are transmitted successively by the sending circuitry to the MHU, are forwarded in order by the MHU and may be rebuilt into the complete payload upon receipt by the receiving circuitry. As part of this operation, as mentioned the use of the FIFO memory 320 at the MHU is particularly convenient in order to retain the order in which messages arrive at the MHU and use that same order for their subsequent transmission on to the receiving circuitry.

In example arrangements, so-called message flags (the one or more flags being included within respective ones of the set of plural successive messages) are used to indicate at least an aspect of the ordering of the message portions. For example, one or more flags may be associated with respective ones of the set of plural successive messages each representing a portion of a longer payload, the one or more flags indicating an ordering of messages within a set of plural successive messages.

Figure 5:
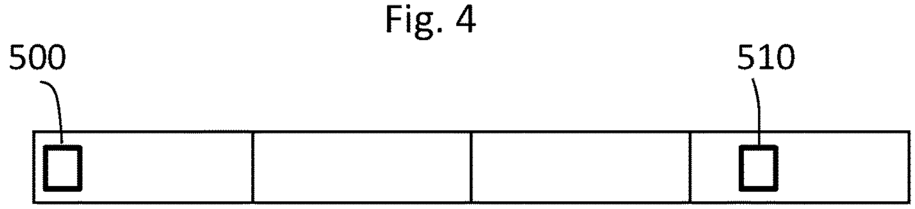
FIGS. 5 and 6 schematically illustrate the use of flags associated with message portions.

With reference to the example of FIG. 5, in which the message portions are ordered (in terms of their partitioning from the larger payload and also their transmission via the arrangements described above) from left to right as drawn, the one or more may comprise a start flag 500 indicative of a first message in a set of plural successive messages and/or an end flag 510 indicative of a last message in a set of plural successive messages.

As described below, a correct or at least not-incorrect ordering of messages as received at the MHU and/or at the receiving circuitry may be detected by a detection that an end flag 510 does not precede a start flag 500, or in other words that whenever an end flag 510 is received, a start flag 500 has been received in either that or a preceding message without another intervening end flag 510. Similarly, two successive start flags 500 should not be received without an intervening end flag 510.

Figure 6:
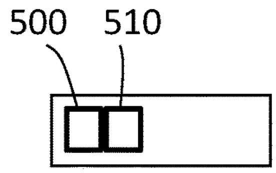

In the case of a single message which complies with the predetermined maximum size, as shown schematically in FIG. 6, that single message may comprise both a start flag 500 and an end flag 510.

Therefore, this arrangement can detect at least some message communication errors. In the case that two successive start flags 500 are received, or in the case that two successive end flags 510 are received, this indicates that something has gone wrong with the message communication arrangement. Of course, even if the start and end flags are received in the correct relative ordering, this does not guarantee that a communication error has not occurred; for example, an intermediate message or message portion not carrying either a start flag or an end flag may have been corrupted or lost. However, given that the message transmitter and the message receiver are configured to operate in separate power, clock and/or reset domains and that each domain is configured to have the respective resource (clock, power, reset) removed or applied independently of the other of the domains, the present arrangement does allow for at least a potential detection of a data communication error arising because of a reset occurring in one domain during transmission or reception of a partitioned message, which would have the effect of disturbing the expected ordering of start and end flags.

Figure 7:
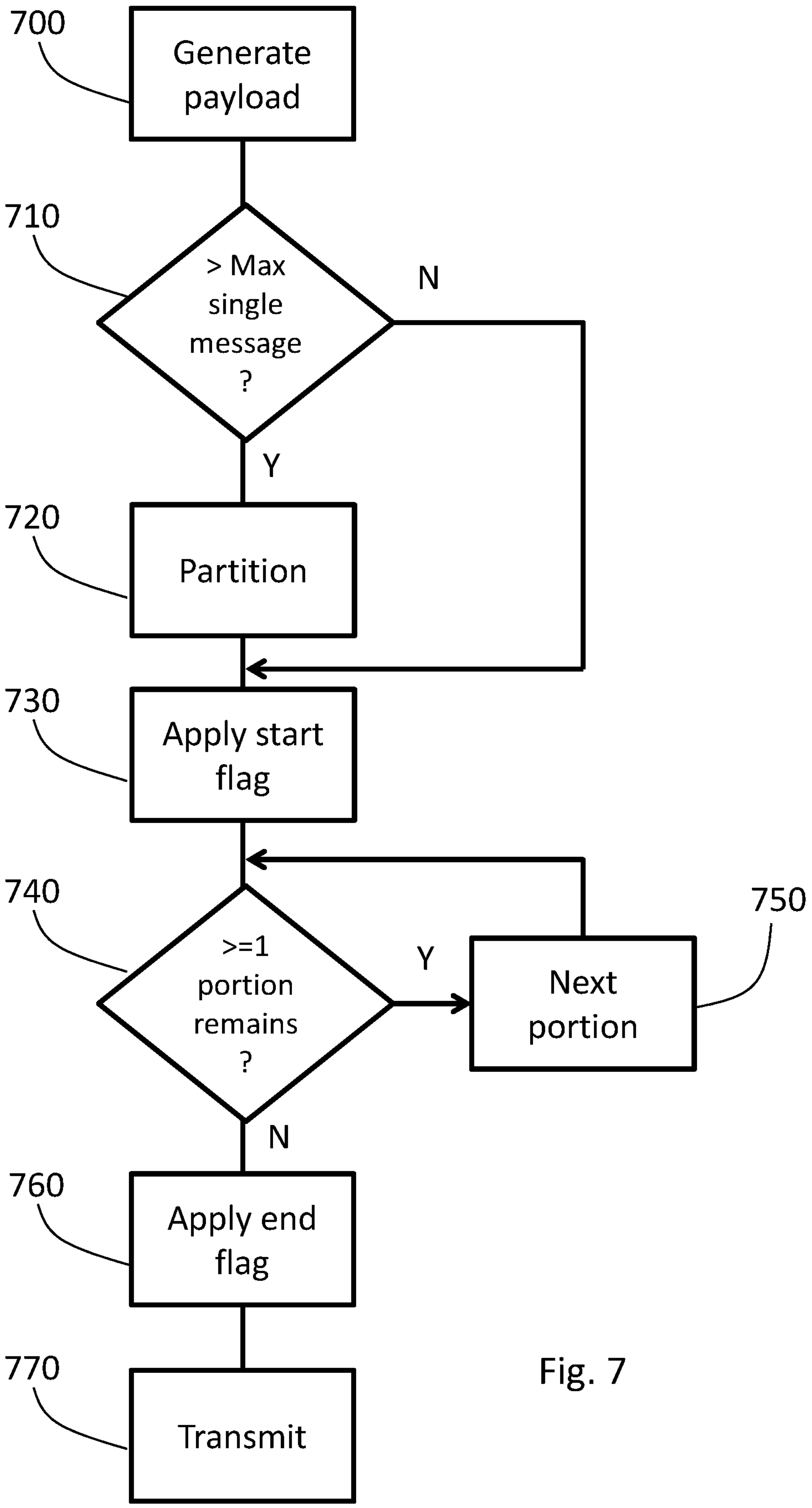
FIGS. 7-9 are schematic flowcharts illustrating respective methods.

FIG. 7 schematically illustrates possible example operations carried out upon message transmission using the flags and associated techniques discussed above.

At a step 700, a message payload is generated. At a step 710, if the payload size is greater than that which can be carried by a single message of the predetermined maximum size then control passes to a step 720 at which the payload is partitioned into individual messages or portions which comply with the predetermined maximum size. If not then the step 720 is bypassed.

As mentioned above, the step 720 can involve partitioning a payload greater than a predetermined size into a set of plural successive messages each equal to the predetermined size and, when the payload has a size different to an integer multiple of the predetermined size, to include padding data in at least one of the set of plural successive messages.

Control then passes to a step 730 at which the start flag 500 is associated with a current message or message portion.

At a step 740, if at least one further portion remains to be handled then control loops round via a step 750 by which each such further portion is handled until a last portion is received, at which stage control passes to a step 760 at which the end flag is associated with a current portion. At a step 770, the set of one or more messages or message portions is transmitted.

Note that in the case that a payload does not require partitioning, this arrangement implies that the start flag and the end flag are associated with a single message representing that payload.

These steps therefore provide an example of a message transmitter being configured to partition 720 a payload greater than a predetermined size into a set of plural successive messages each being no larger than the predetermined size and to associate 730, 760 one or more flags with respective ones of the set of plural successive messages, the one or more flags 500, 510 indicating at least an aspect of an ordering of messages within a set of plural successive messages.

Such a message transmitter, or at least aspects of it, could be implemented as a programmable processor executing appropriate program instructions which, when executed by the programmable processor, cause the programmable processor to perform the method of FIG. 7.

Figure 8:
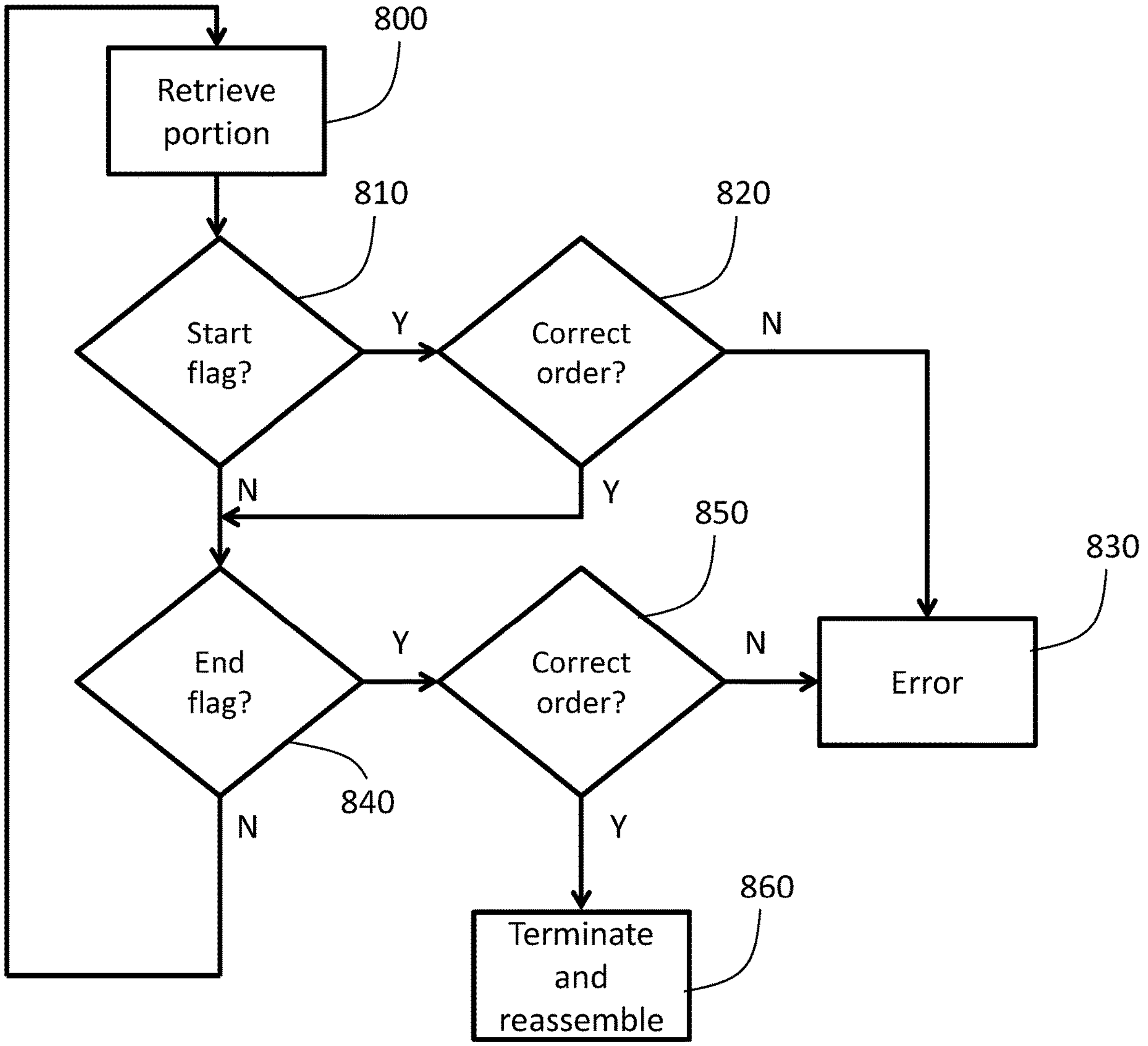

FIG. 8 is a schematic flowchart relating to operations associated with the reception of a potentially partitioned message.

At a step 800 a message portion is retrieved, for example from the FIFO memory 320 or from the memory 340.

If, at a step 810, the retrieved message portion has a start flag then a detection is made at a step 820 as to whether that start flag has occurred in the correct ordering relative to any other start and end flags. If the outcome is negative then control passes to a step 830 at which an error condition is noted and handled. Otherwise, control passes to a step 840 at which a detection is made as to whether the retrieved portion has an end flag. If the outcome is negative then control returns to the step 800 to retrieve a next portion. If on the other hand, the retrieved portion does have an end flag then control passes to a step 850 in which a detection is made as to whether that end flag has occurred in the correct ordering relative to any other start and end flags. If it has not then control passes to the step 830 at which the error condition is noted and handled. If however the answer is positive from the step 850 then control passes to a step 860 at which the processing of the partition messages terminated and the partitioned payload is reassembled from the set of messages between the received start and end flags.

The detections at the steps 820, 850 may be carried out by the controller/bridge circuitry 300, 310 and/or the controller 330 as appropriate, each therefore providing an example of a detector to detect an expected ordering of the one or more flags with respect to receipt by the message receiver of messages of a given set of plural successive messages. The detector may be configured to detect an expected ordering of a start flag and an end flag, for example by detecting whether an instance of a start flag is followed by an instance of an end flag.

The step 830 provides an example in which the detector is configured to indicate an error condition in response to a detection that the one or more flags follow an unexpected ordering with respect to receipt by the message receiver of messages of the given set of plural successive messages. In terms of the handling of the error condition, in examples, in response to indication of the error condition, the message receiver is configured to perform one or more functions selected from the list consisting of:

(i) discard the current contents of the buffer;

(ii) report an error to the message transmitter; and (iii) initiate an error recovery process.

Such a message receiver, or at least aspects of it, could be implemented as a programmable processor executing appropriate program instructions which, when executed by the programmable processor, cause the programmable processor to perform the method of FIG. 8.

Noting that the techniques described above can be used as between sending circuitry as a transmitter and the MHU as a receiver, and/or as between the MHU and the receiving circuitry, and/or as between the sending circuitry and the receiving circuitry, the apparatus discussed above provides an example of data communication apparatus comprising:

a message receiver 150, 110; and a message transmitter 100, 150 respectively to transmit messages to the message receiver;

the message transmitter being configured to partition a payload greater than a predetermined size into a set of plural successive messages each being no larger than the predetermined size and to associate one or more flags with respective ones of the set of plural successive messages, the one or more flags 500, 510 indicating an ordering of messages within a set of plural successive messages; and the message receiver comprising:

a buffer 320, 340 to buffer received messages of a set of plural successive messages to reassemble a payload represented by the given set of plural successive messages; and a detector 300, 310, 330 to detect an expected ordering of the one or more flags with respect to receipt by the message receiver of messages of a given set of plural successive messages.

Figure 9:
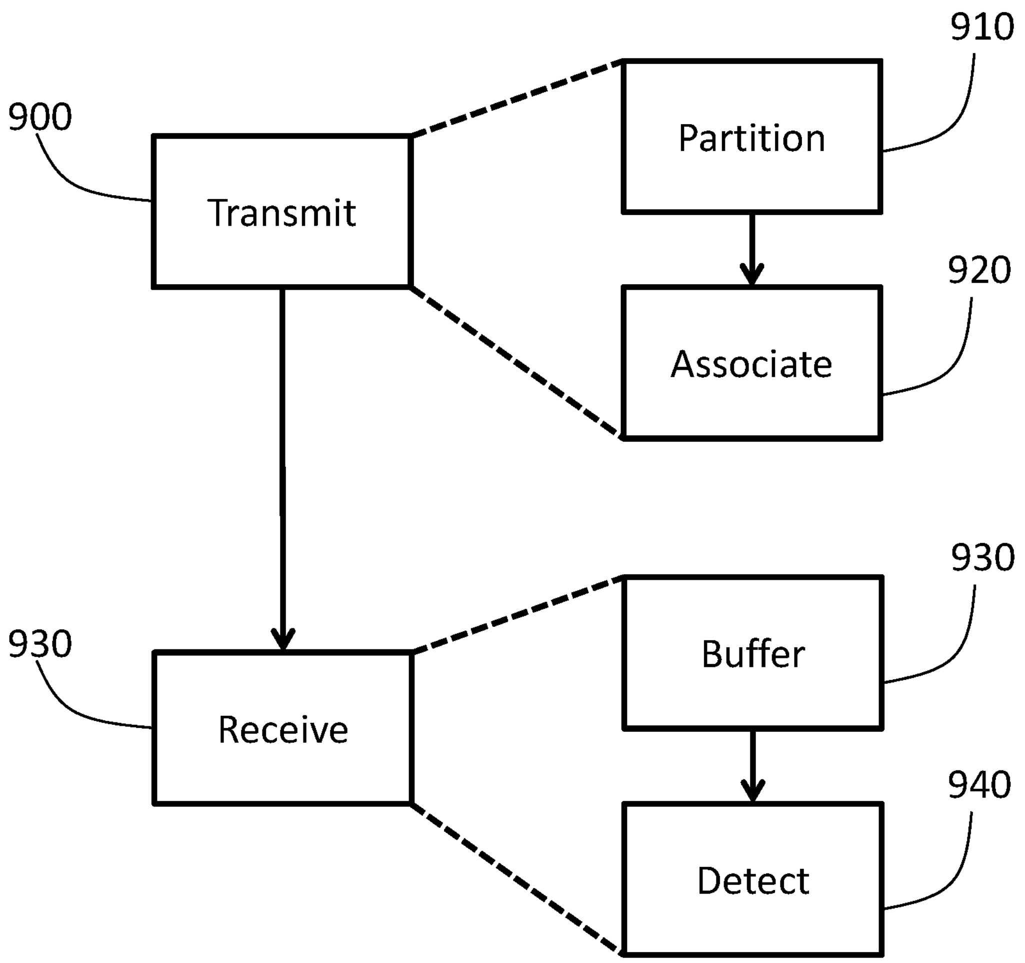

FIG. 9 is a schematic flowchart illustrating a data communication method comprising:

transmitting (at a step 900) messages from a message transmitter to a message receiver;

the transmitting step comprising:

partitioning (at a step 910) a payload greater than a predetermined size into a set of plural successive messages each being no larger than the predetermined size; and associating (at a step 920) one or more flags with respective ones of the set of plural successive messages, the one or more flags indicating an ordering of messages within a set of plural successive messages; and receiving (at a step 930) the messages at a message receiver, the receiving step comprising:

buffering (at a step 940) received messages of a set of plural successive messages to reassemble a payload represented by the given set of plural successive messages; and detecting (at a step 950) an expected ordering of the one or more flags with respect to receipt by the message receiver of messages of a given set of plural successive messages.

Such a process, or at least aspects of it, could be implemented by a programmable processor executing appropriate program instructions which, when executed by the programmable processor, cause the programmable processor to perform the method of FIG. 9.

It will be appreciated that such program instructions, or a non-transitory machine-readable medium storing such instructions, are considered to represent embodiments of the present disclosure.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. Data communication apparatus comprising:

a message receiver; and a message transmitter configured to transmit messages to the message receiver;

the message transmitter being configured:

to partition a payload greater than a predetermined size into a set of plural successive messages each being no larger than the predetermined size and to associate one or more flags with respective ones of the set of plural successive messages, the one or more flags indicating an ordering of messages within the set of plural successive messages, wherein the set of plural successive messages comprises at least one intermediate message, and the intermediate message is not associated with a respective one of the one or more flags; and to transmit the set of plural successive messages to be received in an expected order; and the message receiver comprising:

a buffer configured to buffer received messages of a given set of plural successive messages to reassemble a payload represented by the given set of plural successive messages; and detector circuitry configured to detect an expected ordering of the one or more flags with respect to receipt by the message receiver of messages of the given set of plural successive messages, in which:

the detector circuitry is configured to indicate an error condition in response to a detection that any of the one or more flags follow an unexpected ordering with respect to receipt by the message receiver of messages of the given set of plural successive messages, the one or more flags comprise a start flag indicative of a first message in the given set of plural successive messages and an end flag indicative of a last message in the given a set of plural successive messages, and the detector circuitry is configured to detect an expected ordering of the start flag and the end flag.

2. The apparatus of claim 1, in which the detector circuitry is configured to detect whether an instance of a start flag is followed by an instance of an end flag.

3. The apparatus of claim 1, in which, in response to indication of the error condition, the message receiver is configured to perform one or more functions selected from the list consisting of:

(i) discard the current contents of the buffer;

(ii) report an error to the message transmitter; and (iii) initiate an error recovery process.

4. The apparatus of claim 1, in which the message transmitter is configured to partition the payload greater than the predetermined size into the set of plural successive messages each equal to the predetermined size and, when the payload has a size different to an integer multiple of the predetermined size, to include padding data in at least one of the set of plural successive messages.

5. The apparatus of claim 1, in which the message transmitter is configured to include the one or more flags within respective ones of the set of plural successive messages.

6. The apparatus of claim 1, in which the buffer is a first-in-first-out buffer.

7. The apparatus of claim 1, in which one or both of the message transmitter and the message receiver comprises a plurality of data communication circuitries connected together by interconnect circuitry.

8. The apparatus of claim 1, comprising two or more data communication circuitries, each being selectively operable as one of a message transmitter and a message receiver.

9. The apparatus of claim 1, in which the message transmitter and the message receiver are configured to operate in separate power, clock and/or reset domains.

10. The apparatus of claim 9, in which each domain is configured to have a respective clock, power and/or reset resource removed or applied independently of the other of the domains.

11. A data communication method comprising:

transmitting messages from a message transmitter to a message receiver;

the transmitting step comprising:

partitioning a payload greater than a predetermined size into a set of plural successive messages each being no larger than the predetermined size;

associating one or more flags with respective ones of the set of plural successive messages, the one or more flags indicating an ordering of messages within the set of plural successive messages, wherein the set of plural successive messages comprises at least one intermediate message, and the intermediate message is not associated with a respective one of the one or more flags;

transmitting the set of plural successive messages to be received in an expected order; and receiving the messages at the message receiver, the receiving step comprising:

buffering received messages of a given set of plural successive messages to reassemble a payload represented by the given set of plural successive messages; and detecting an expected ordering of the one or more flags with respect to receipt by the message receiver of messages of the given set of plural successive messages; and indicating an error condition in response to detecting that any of the one or more flags follow an unexpected ordering with respect to receipt by the message receiver of messages of the given set of plural successive messages, wherein the one or more flags comprise a start flag indicative of a first message in the given set of plural successive messages and an end flag indicative of a last message in the given set of plural successive messages; and detecting an expected ordering of the start flag and the end flag.

* * * * *